United States Patent Office 3,439,629
Patented Apr. 22, 1969

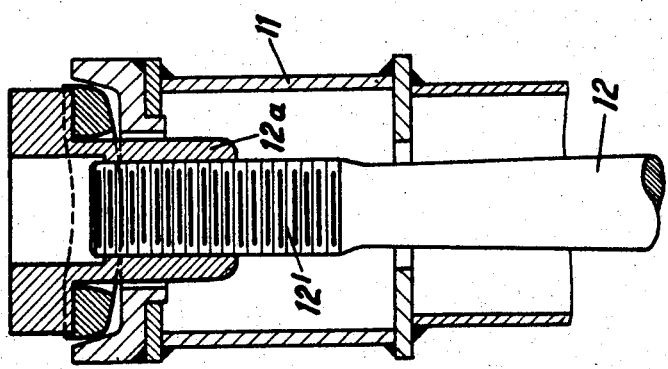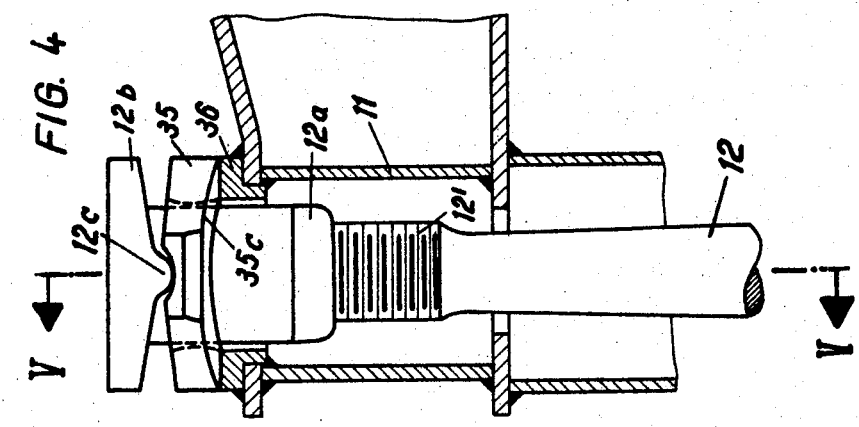

3,439,629
MONORAIL TRUCK
Konrad Deller, Cologne-Deutz, Germany, assignor to ALWEG Gesellschaft mit beschrankter Haftung, Essen, Germany
Filed Oct. 4, 1966, Ser. No. 584,178
Claims priority, application Germany, Oct. 16, 1965, A 50,525
Int. Cl. B61b 13/04; B61c 9/38
U.S. Cl. 105—133                                 5 Claims

ABSTRACT OF THE DISCLOSURE

A truck for vehicles of monorail trains, which includes two pairs of load carrying wheels equipped with pneumatic tires for engagement with the top surface of a monorail and arranged one behind the other in the driving direction of the truck, guiding wheels at the front and the rear of the truck frame and on opposite sides thereof for guiding engagement with upper portions of opposite side surfaces of a monorail, supporting wheels on opposite sides of the longitudinal central plane of the truck frame, said guiding wheels and said supporting wheels and said load carrying wheels being fixedly rotatably journalled in said truck frame, pivotal suspension means including spring means suspended on said truck frame and supporting a cradle for movement along a substantially horizontal plane, and swivel joint means supported by said cradle for connection with a railway box of at least one railway vehicle.

---

The present invention relates to a truck for vehicles of monorail trains which in the manner of a saddle embraces a track rail for supporting one of the ends of a vehicle or for supporting one of the adjacent ends of two succeeding vehicles, and which comprises a truck frame with two pairs of supporting wheels moving on the top side of said track rail and being equipped with supporting wheels having pneumatic tires, and with guiding and supporting wheels having no wheel flange, said pairs of pneumatic tire equipped supporting wheels being arranged one behind the other. Of the said wheels, two guiding wheels each on both sides of the track rail are arranged one behind the other when looking in driving direction and move on the lateral surface of the track rail in the upper range thereof while a supporting wheel is arranged between said guiding wheels and moves on the lateral surface of the track rail within the lower range of said lateral surface, all of said running wheels being firmly rotatably journalled on said truck frame.

Truck frames for vehicles of monorail trains have become known in various designs equipped with wheels with and without wheel flanges, and furthermore equipped with pneumatic tires as well as with tires the tread surfaces of which are covered by solid rubber. Experience has shown that during operation, especially when passing through curves, forces act upon the vehicle box which produce vibrations and thus cause discomfort to the passengers.

It is, therefore, an object of the present invention to provide a truck or bogie of the above mentioned type which will overcome the above outlined drawbacks.

It is another object of this invention to provide a truck or bogie which will have better running properties than heretofore known trucks of the type involved.

Figure 1:
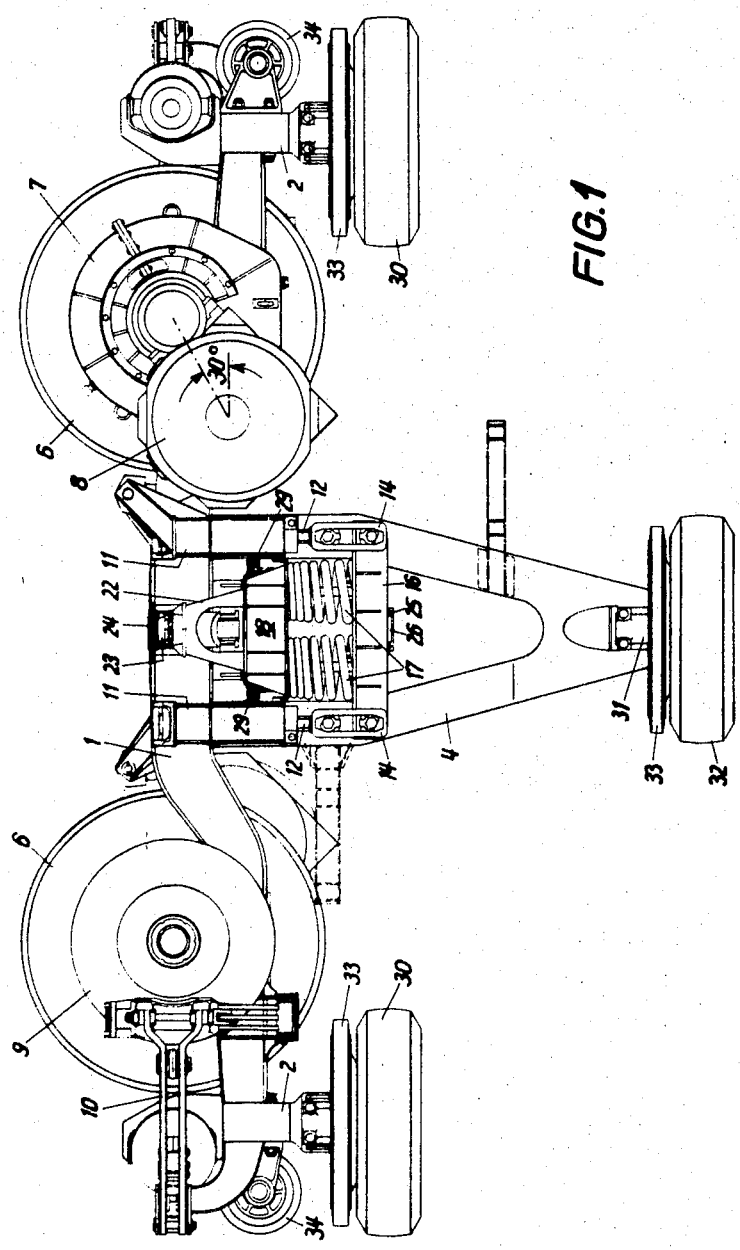
Figure 2:
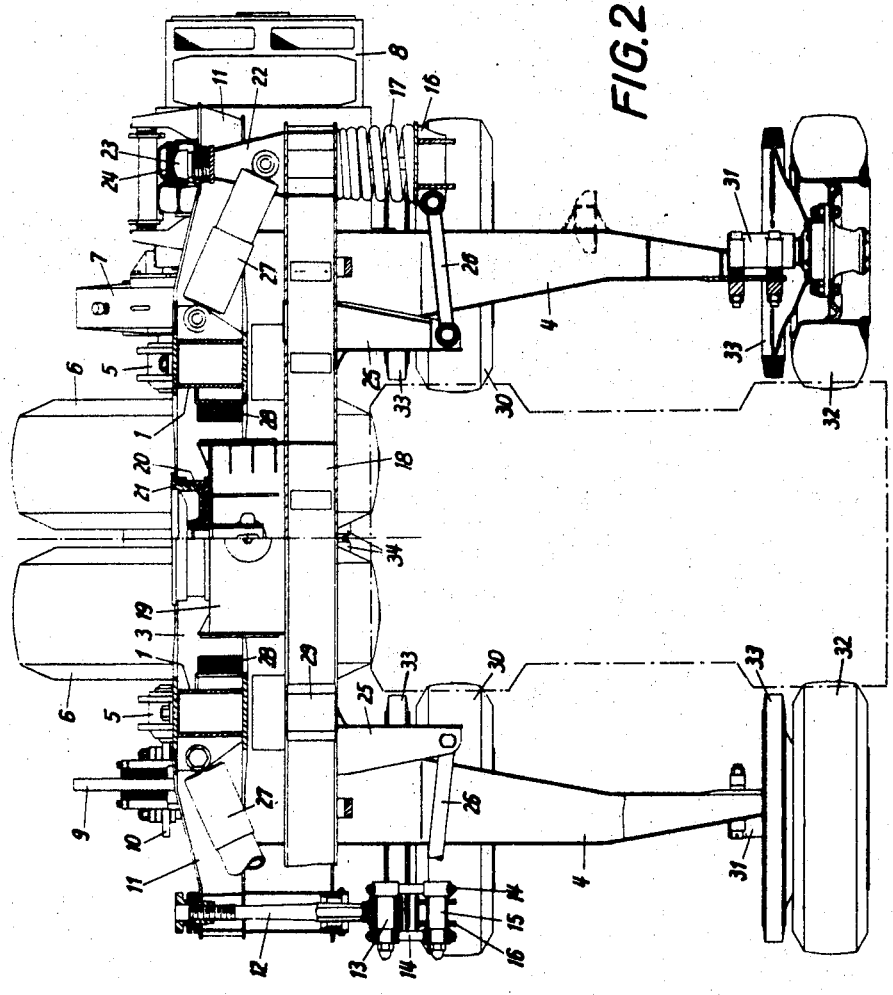
Figure 3:
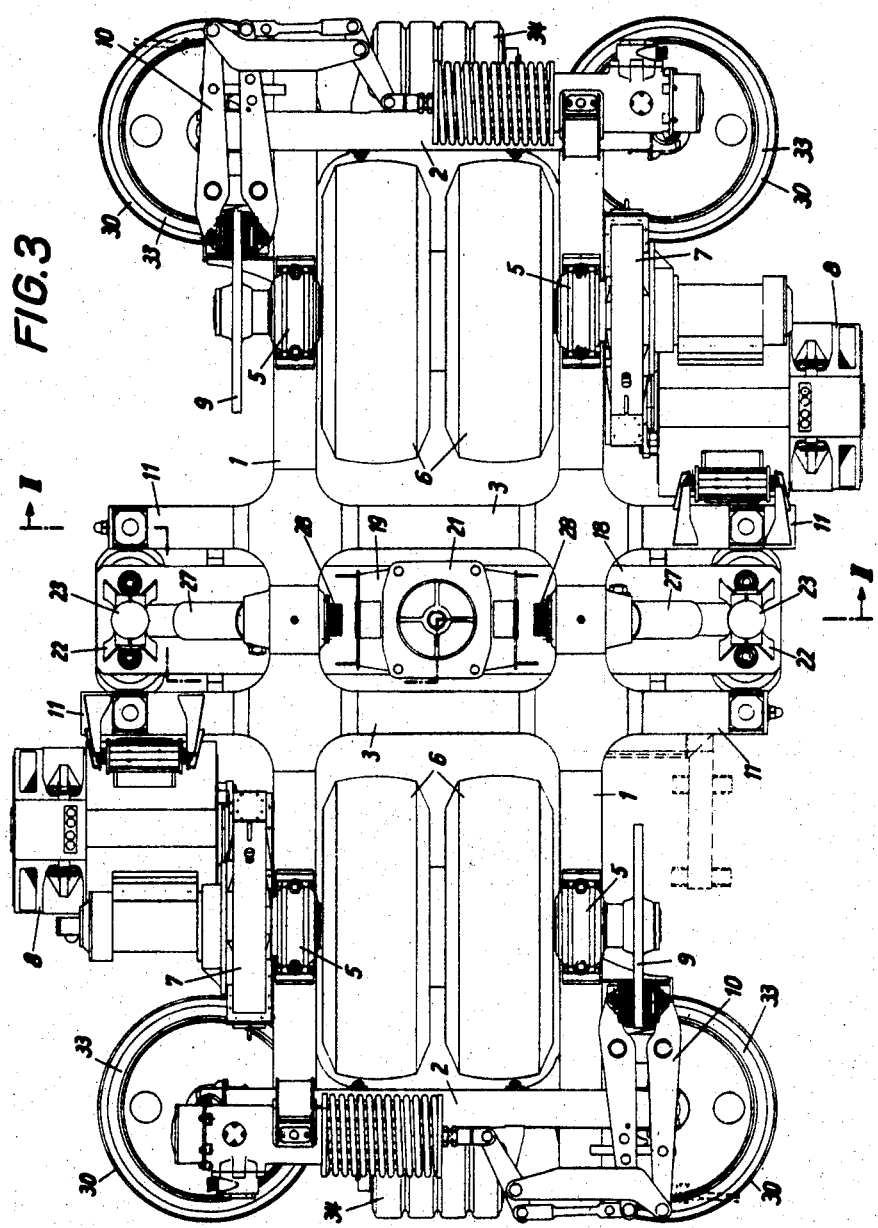

These and other objects and advantages of the invention will appear more clearly from the following specification in connection with the accompanying drawings, in which:

FIG. 1 illustrates a side view of a truck according to the present invention.
FIG. 2 is a section taken along the line II—II of FIG. 3.
FIG. 3 is a top view of a truck according to the invention.
FIG. 4 illustrates partly in section and partly in view a pendulum type suspension for use in connection with the present invention, said section being taken transverse to the driving direction of the truck.
FIG. 5 is a section along the line V—V of FIG. 4.

The truck or bogie according to the present invention is characterized primarily in that a cradle is suspended in the truck frame in a manner known per se through the intervention of supporting springs and spring supports on pendulum-like members for movement in horizontal direction. Said cradle is connected with the vehicle box of at least one vehicle through the intervention of pivot means having a vertical pivot axis and adapted to transmit horizontal and vertical forces. The guiding wheels respectively provided on each side of the track rail are in a manner known per se spaced from each other by a greater distance than the pairs of supporting wheels. In this way, a highly satisfactory guiding of the truck on the track rail will be obtained and the vehicle box will be journalled on the truck in a shock-free manner.

In conformity with a further development of the present invention, the pendulum-like members carrying the cradle rest on laterally protruding arms of the truck frame and when looking in driving direction of the monorail train are located in front and behind the supporting springs. Such an arrangement brings about a favorable transfer of the forces between the vehicle box and the truck and also assures a more favorable flow of forces in view of the fact that the guiding wheels are journalled on the downwardly bent ends of the head supports of the truck frame, said head supports extending beyond the connecting areas with the longitudinal beams.

According to a further development of the present invention, also the guiding and supporting wheels are equipped with pneumatic tires, and emergency rollers are provided for all running wheels. The running surface of said rollers is covered with solid rubber. When passing through a curve, the pneumatic tires of the guiding wheels under load spring so that the inclined running angle on the supporting wheels will also with narrow curves remain within the limits admissible with regard to wear.

Referring now to the drawings in detail, the truck shown therein forms a welded box structure and comprises primarily two longitudinal girders 1, two head girders 2, two transverse girders 3 arranged between said head girders 2 and interconnecting the longitudinal girders 1. The truck furthermore comprises two downwardly extending arms 4 which laterally embrace the track rail.

Bearings 5 for the shafts of load carrying wheels 6 arranged between the longitudinal girders 1 are connected to the latter. Two supporting wheels 6 are arranged on each of said shafts. The shafts for the supporting wheels 6 extend through the bearings 5. One end each of said last mentioned shafts is connected to one electric motor 8 through the intervention of a transmission 7. The said electric motors are mounted on the sides of the truck frame. The motor shafts extend parallel to the shafts for the load carrying wheels 6 and are closer to the vertical center transverse plane and lower than the shafts for the load carrying wheels 6 and are closer to a direction transverse to the driving direction, the connecting lines of the centers of the supporting wheel shafts and motor shafts confine with the horizontal an angle of approximately 30°. The transmission 7 and the electric motors 8 are arranged on different sides of the vertical longitudinal plane and the vertical transverse plane of the truck. One brake disc 9 each is connected to the other ends of the shafts for the supporting wheels, jaws of a disc brake 10 being provided for engagement with the brake disc 9. The transverse beams or girders 3 have extensions in the form of arms 11 which protrude beyond the longitudinal girders 1 and support two pendulums 12 (FIGS. 1, 4 and 5) each through the intervention of serially arranged edges, said pendulums extending downwardly and being adjustable as to height.

The upper end of each pendulum is provided with a thread 12′ having a nut 12a including a collar 12b threaded thereon. This collar has two downwardly extending protrusions 12c arranged in front of and behind the axis of the pendulum when looking in driving direction of the truck.

These protrusions 12c rest in corresponding recesses 35a of respective intermediate rings 35. The said protrusions 12c and recesses 35a form the upper edge permitting oscillations of the pendulums 12 in a direction transverse to the driving direction of the truck. The bottom side 35c of the intermediate ring 35 is crowned in planes parallel to the driving direction of the truck and it is by this crowned portion that intermediate ring 35 rests on a U-shaped supporting member 36. The said crowned portion on the bottom side of said intermediate ring 35 and the corresponding rolling surface on the top of supporting member 36 together form the lower edge which permits oscillations of the pendulum 12 relative to arms 11 in the plane parallel to the driving direction of the truck. By means of the edges described above and located at a right angle with regard to each other there is formed the pendulum 12 which permits inclined positions of pendulum 12 relative to arm 11 in any desired direction. The adjustment as to height is adapted to be effected by the thread nut engagement 12′, 12a.

The said pandulums have their lower ends provided with a bore receiving a shaft 13 extending transverse to the driving direction. At the ends of the shafts 13 there are in correspondingly shaped grooves suspended chainlike yokes 14 in which the grooved ends of additional shafts 15 rest. On each side of the truck, the shafts 15 are connected to a spring support 16 extending in the driving direction. A cradle 18 which extends in a direction transverse to the driving direction and is located substantially below the longitudinal girder 1 rests on said spring supports 16 through the intervention of pressure springs 17.

The central portion of cradle 18 has an attachment connected thereto on which rests a bearing socket or turntable 20 forming part of swivel joint means. A pivot-like extension 21 of the railway box (not illustrated) extends into said socket 20. The weight of the railway box is through the intervention of said bearing socket or turntable 20 conveyed to the cradle 18 and from the latter through spring 17, spring supports 16, and the pendulum means 12, 13, 14, 15 to the truck frame and furthermore through the supporting wheels 6 onto the track rail. In order to prevent the railway box from tilting toward the side, the ends of cradle 18 are provided with upwardly extending supports 22 the upper ends of which are equipped with spherical heads 23 adjustable as to height by a thread-nut arrangement 37, 37a. The railway box rests through sliding members 24 upon the said spherical heads 23.

Cradle 18 has furthermore connected thereto downwardly extending arms 25 the lower ends of which have linked thereto one end of pull and pressure bars 26. The other ends of the bars 26 are pivotally connected to spring supports 16. These devices serve for conveying forces acting transverse to the driving direction, as they occur for instance when driving through curves, from the truck to the railway box and vice versa. Undesired vibrations are cushioned by shock absorbers 27 which are provided between the cradle 18 and the truck frame. An undue lateral oscillation of cradle 18 is prevented by rubber buffers 28 which are connected to said longitudinal girders 1 and against which the extension 19 of cradle 18 may rest. Further rubber buffers 29 limit a movement of the cradle 18 in driving direction away from the desired central position and also prevent a turning of the cradle about the vertical axis.

The head girders or beams 2 of the truck frame are extended beyond their connecting points with the longitudinal girders 1. The downwardly bent ends of said head beams 2 have connected thereto the bearings for guiding wheels 30 which are equipped with pneumatic tires. The guiding wheels 30 are not driven but roll on the lateral surfaces of the track rail when the monorail train is in movement. The wheel base of said guiding wheels 30 in driving direction is approximately by 50% longer than the wheel base of the supporting wheels 6. The bearings 31 for the supporting wheels 32 which latter are likewise equipped with pneumatic tires, are not driven but are connected to the lower ends of the downwardly extending arms 4 of the truck frame. The supporting wheels 32 will, when in operation, roll upon the lower lateral surface of the track rail. Above each guiding wheel 30 and supporting wheel 32 there is connected thereto an emergency wheel 33 the running surface of which is covered by a rubber layer. Further emergency wheels 34 are journalled on the head beams 2 of the truck. The emergency wheels 33, 34 will assure a safe location of the truck frame on the track rail even when the pneumatic tires should fail.

In order to keep the mass inertia moment of the truck about the vertical central axis low, the carrying wheels 6 are arranged as close to each other as possible. Furthermore, in view of the fact that the weight of the railway box is absorbed primarily through the bearing socket or turntable 20 with its relatively short diameter, it will be appreciated that when the truck turns relative to the railway box about the vertical central plane, the torque resulting from the friction will be so low that only a slight resistance will be offered such movement. In this connection it should be noted that vertical forces will be conveyed also through supports 22 of the cradle only when the load acts eccentrically or the acceleration acts in a direction transverse to the driving direction. Thus, only slight forces tending to move the truck out of the path determined by the track rail are exerted upon the truck, so that the load on the guiding wheels and thus the spring thereof remains low. Moreover, in view of the short wheel base of the load carrying wheels 6, advantageously only a small oblique running angle of the said load carrying wheels during a drive through curves will occur as a result of which the load carrying wheels 6 will be subjected only to a slight wear.

In view of the large spacing of the guiding wheels from each other in driving direction, the guiding of the truck will be further improved. Moreover, by maintaining a high pressure in the pneumatic tires of the guiding wheels, a taut guiding of the truck on the track rail will be obtained.

The cradle arranged between the truck and the railway box brings about a favorable transmission of vertical as well as horizontal forces so that the truck which is guided in a taut manner on the track rail will not exert any shocks or vibrations upon the railway box which may cause discomfort to the passengers.

It is, of course, to be understood that the present invention is, by no means, limited to the particular arrangement shown in the drawings but also comprises any modifications defined by the appended claims.

I claim:

1. A truck for vehicles of monorail trains, which includes: a truck frame, two pairs of load-carrying wheels equipped with pneumatic tires for engagement with the top surface of a monorail, said pairs of load-carrying wheels being arranged one behind the other when looking in the driving direction of said truck, guiding wheels mounted on the front and rear portions of said truck frame and on opposite sides thereof for guiding engagement with upper portions of opposite side surfaces of a monorail, said load-carrying wheels being located between the planes through the axes of rotation of said guiding wheels at the front and rear portions respectively of said truck frame, supporting wheels supported by said truck frame and arranged on opposite sides of the longitudinal central plane thereof for rolling engagement with opposite lower side surfaces of a monorail, the axes of rotation of said supporting wheels being located in a plane substantially equidistantly spaced from said pairs of load-carrying wheels, said guiding wheels and said supporting wheels and said load-carrying wheels being fixedly rotatably journalled in said truck frame, pivotal suspension means including spring means suspended on said truck frame, cradle means supported by said suspension means for movement along a substantially horizontal plane, and swivel joint means having a substantially vertical axis and being adapted to transmit horizontal and vertical forces while being supported by said cradle means for connection with a railway box of at least one railway vehicle.

2. A truck frame according to claim 1, in which said truck frame has its front and rear portions provided with downwardly directed extensions rotatably supporting said guiding wheels.

3. A truck frame according to claim 1, in which the guiding and supporting wheels are respectively equipped with pneumatic tires, and emergency wheels respectively located adjacent the pneumatic tires of all of the pneumatic tire equipped wheels and having running surfaces formed by solid rubber for engagement with the respective surfaces of a monorail in case of failure of the respective adjacent pneumatic tires.

4. A truck frame according to claim 1, which includes motor means respectively drivingly connected to said load-carrying wheels and supported by said truck frame, said motor means having driving shafts located closer to the vertical transverse plane of said frame than the axes of rotation of the respective adjacent load-carrying wheels, the axes of rotation of said driving shafts being located at a level lower than the level of the axes of said load-carrying wheels.

5. A truck for vehicles of monorail trains, which includes: a truck frame, two pairs of load-carrying wheels equipped with pneumatic tires for engagement with the top surface of a monorail, said pairs of load-carrying wheels being arranged one behind the other when looking in the driving direction of said truck, the central portion of said truck frame between said pairs of load-carrying wheels being provided with arms respectively extending laterally outwardly in opposite directions, guiding wheels mounted on the front and rear portions of said truck frame and on opposite sides thereof for guiding engagement with upper portions of opposite side surfaces of a monorail, said load-carrying wheels being located between the planes through the axes of rotation of said guiding wheels at the front and rear portions respectively of said truck frame, supporting wheels supported by said truck frame and arranged on opposite sides of the longitudinal central plane thereof for rolling engagement with opposite lower side surfaces of a monorail, the axes of rotation of said supporting wheels being located in a plane substantially equidistantly spaced from said pairs of load-carrying wheels, said guiding wheels and said supporting wheels and said load-carrying wheels being fixedly rotatably journalled in said truck frame, pivotal suspension means including spring means suspended on said truck frame, cradle means supported by said suspension means for movement along a substantially horizontal plane, said suspension means including pendulum means carrying said cradle means and supported by said arms, said pendulum means respectively being located ahead of and behind said spring means when looking in the longitudinal direction of said truck frame, and swivel joint means having a substantially vertical axis and being adapted to transmit horizontal and vertical forces while being supported by said cradle means for connection with a railway box of at least one railway vehicle.

References Cited

UNITED STATES PATENTS

| | | | |
|---|---|---|---|
| 2,932,258 | 4/1960 | Marquard | 105—145 XR |
| 2,987,013 | 6/1961 | Rosenbaum | 104—120 XR |
| 3,048,127 | 8/1962 | Oberpaul | 104—120 XR |
| 3,092,039 | 6/1963 | Lich | 104—119 |
| 3,216,371 | 11/1965 | Holmquist et al. | 105—145 |

FOREIGN PATENTS

| | | |
|---|---|---|
| 237,026 | 11/1964 | Austria. |
| 907,061 | 3/1954 | Germany. |
| 1,003,784 | 3/1957 | Germany. |

OTHER REFERENCES

Eleltrotechnische Zeitschreff-B, vol. 14, issue 16, Aug. 6, 1962, p. 429, penultimate paragraph.

ARTHUR L. LA POINT, *Primary Examiner.*

HOWARD BELTRAN, *Assistant Examiner.*

U.S. Cl. X.R.

104—120; 105—145, 215